March 23, 1926. 1,578,223

M. J. WACLAW

DYNAMIC COMPENSATOR

Filed Dec. 26, 1924 2 Sheets-Sheet 1

WITNESSES
J. T. Schrott
A. V. Martin

INVENTOR
Martin J. Waclaw
BY
ATTORNEYS

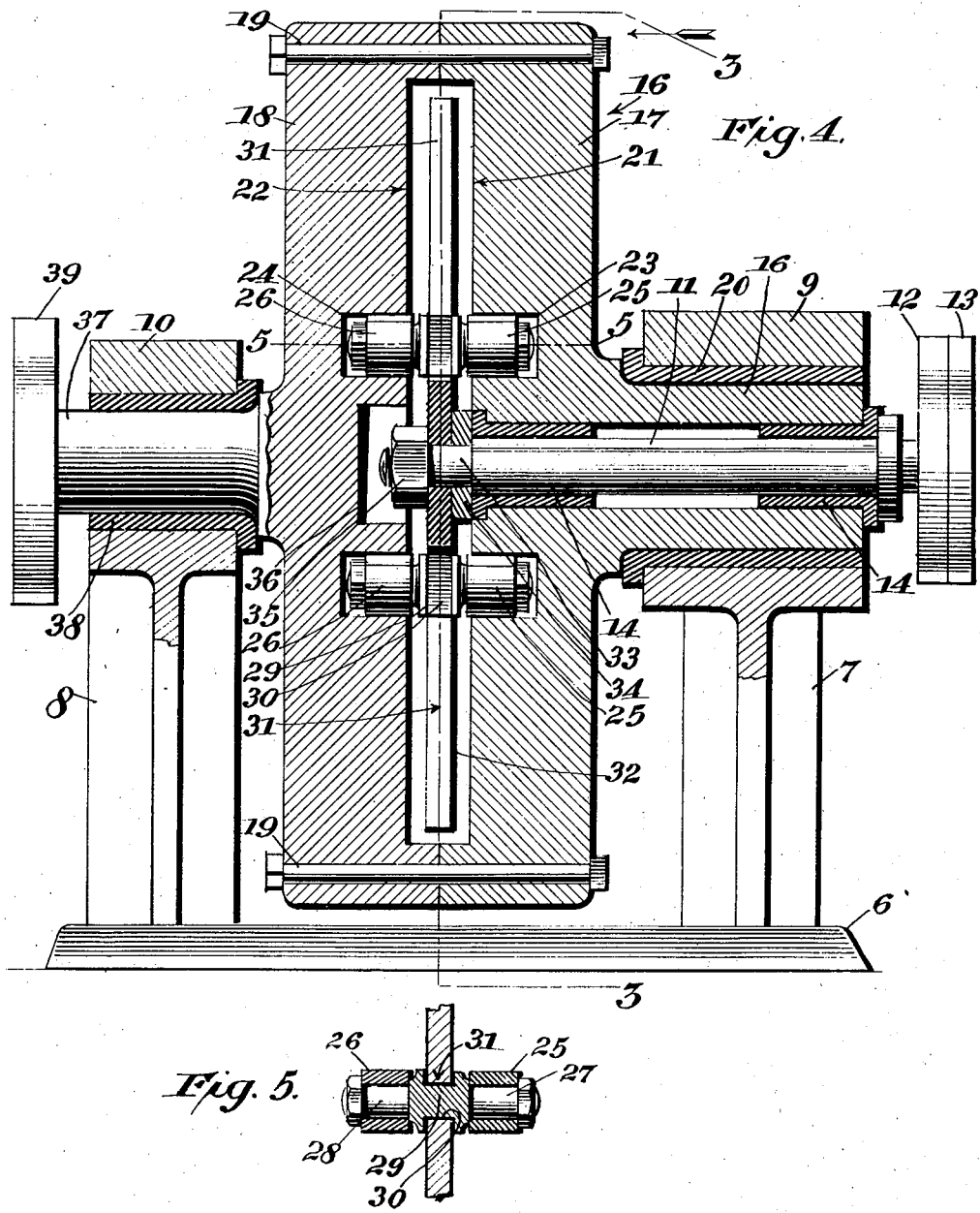

Patented Mar. 23, 1926.

1,578,223

UNITED STATES PATENT OFFICE.

MARTIN J. WACLAW, OF BETHLEHEM, PENNSYLVANIA.

DYNAMIC COMPENSATOR.

Application filed December 26, 1924. Serial No. 758,267.

*To all whom it may concern:*

Be it known that I, MARTIN J. WACLAW, a citizen of the United States, residing at Bethlehem, in the county of Northampton and State of Pennsylvania, have invented certain new and useful Improvements in Dynamic Compensators, of which the following is a specification.

This invention relates to improvements in power transmission mechanisms, and it consists of the constructions, combinations and arrangements herein described and claimed.

An object of the invention is to provide means for adjusting a substantially constant torque of a prime mover to varying loads.

Another object of the invention is to adapt the principles of the compensator to uses in connection with such prime movers as an engine in a motor vehicle, alternating current induction motors, speed reduction mechanism for steam turbines, etc.

Figure 3:
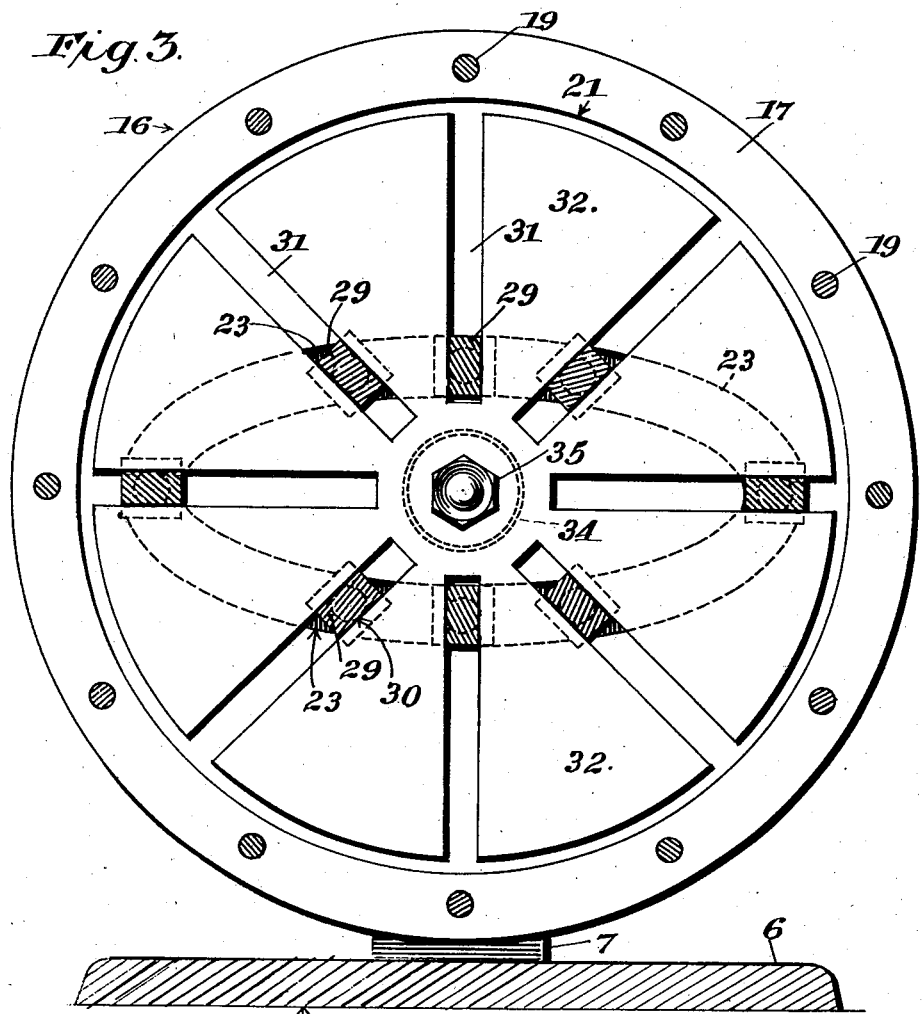
Figure 1:
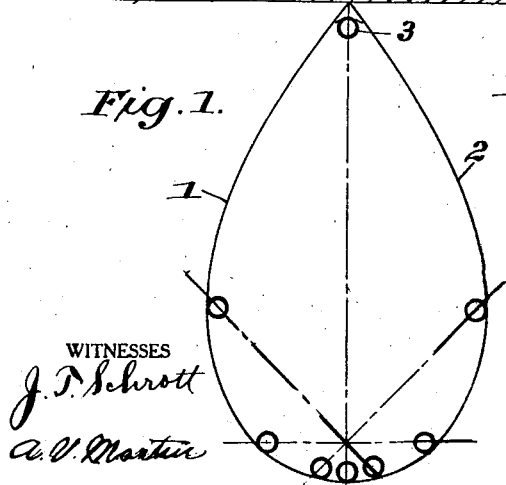
Figure 2:
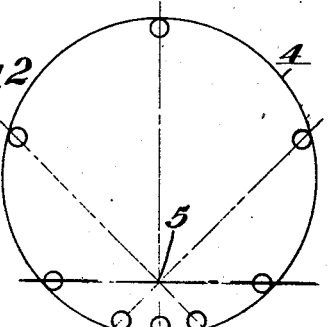

Other objects and advantages appear in the following specification, reference being had to the accompanying drawings in which Figure 1, is a diagram illustrating one type of race by means of which the principles of the invention may possibly be carried out, Figure 2, is a diagram illustrating another type of race for the same purpose, Figure 3, is a cross section on the line 3—3 of Figure 4 illustrating a structure by means of which the invention is demonstrated, the race being in the shape of the preferred ellipse, Figure 4, is a longitudinal section of the compensator, Figure 5, is a detail section of one of the slidable weights and the associated set of rollers.

As previously stated, it is a purpose of the invention to provide a mechanism by means of which the substantially uniform torque of a prime mover is adjusted or adapted to varying loads. The need for a mechanism of such characteristic is daily apparent. The internal combustion motor of the familiar automobile is capable of delivering power at a substantially uniform torque, but in order that the motor may be adaptable to the needs of the automobile it is necessary to interpose speed-change or transmission gearing between the motor and the transmission shaft.

This necessitates complicated machinery and the mastery of a driving technique by the operator. In the case of alternating current induction motors it is desirable to obtain the speed-torque characteristic of a series motor. Speed reducing mechanisms are necessary in innumerable applications of power, and it is the purpose of this invention to supply the latter demand and to meet the preceding problems. In the case of slow speed prime movers it may be necessary to interpose a gear train between the prime mover and dynamic compensator.

It has been found that if an object rotates with uniform angular velocity about a fixed point which does not coincide with its center of gravity, and is free to travel along its radius vector, then this object will describe a certain curve which can be readily derived mathematically.

In Figure 1, two such curves 1 and 2, described by half revolutions, are shown placed together to produce a symmetrical figure. These curves must be regarded as a race upon which rollers 3 are being driven. Assuming the driving force as being that of clockwise rotation it is quickly seen that the left hand race 1 will be entirely free from pressure, due to the action of centrifugal force upon the rollers, while the right hand race 2 will be subjected to a force equal to twice the centrifugal force at any given point of contact with the race. This will be readily understood considering that the rollers in addition to rotation about the axis of the shaft (see shaft 11, Fig. 4) are being accelerated toward said axis; this, due to the form of the races, is numerically equal to the centripedal acceleration due to the rotation about the axis. It is to be noted that in certain quarters of rotation the rollers are accelerated away from and in others toward the axis, neutralizing the centrifugal force in the former and doubling the centrifugal force in the latter.

These forces resolved into components will produce a turning movement or torque about the axis of the race coinciding with the axis of the driving frame by which the rollers are presumably carried. In this mechanism resultant torque is proportional to the mass of rollers or weights (as develops later) and the square of the relative angular velocity between the driving frame and race. The race represents the driven element.

Assuming a constant angular velocity of a prime mover connected to a driving frame of the rollers 3, then any change of load will cause a corresponding change in relative angular velocity resulting in a change of torque and resultant speed without affecting the power output of the prime mover. The same, but less pronounced, effect may be obtained by substituting a circular race 4 (Fig. 2) eccentrically located as at 5 with respect to a driving frame, but rotating about a common axis.

The curves illustrated in Figures 1 and 2 are useful in elucidating the principles of the invention, but are objectionable in practice on account of lacking in dynamic balance. An ellipse is regarded as best adapted for practical purposes, and the race or races in the mechanical reduction of the invention in Figs. 3 to 5 are elliptical in shape.

In carrying out the invention provision is made of a base 6 of suitable design and proportions, having a pair of standards 7 and 8 which terminate in bearings 9 and 10. The mechanism is herein known as a "dynamic compensator" due to its qualities of adjusting movable forces which under certain circumstances would be undesirably variable.

The drive shaft 11 of the compensator has a suitable disk 12 with which the corresponding disk 13 of a prime mover is permanently connected. The prime mover is not shown, but the disk 13 must be regarded as representative thereof. This shaft turns in internal bearing sleeves 14. These are fastened in the combined tubular extension and bearing sleeve 15 or the casing 16.

This casing is composed of halves or sections 17 and 18, suitably bolted together at 19. The bearing sleeve 15 turns in a bushing 20 carried by the bearing 9. The rotation of the casing 16 is in a measure independent of the drive shaft 11, although driving motion is derived therefrom.

Formed in the confronting faces of large counter bores 21 and 22 in the casing sections 17 and 18 are elliptical races 23 and 24. These are occupied by rollers 25 and 26 journalled upon the trunnions 27 and 28 of slidable weights 29. One of the weights, and associated parts, is shown in detail in Fig. 5, and all others are the same.

The weight 29 has parallel and opposite grooves 30 received by and movable in a slot 31 (of which there is a plurality) in the disk 32. This disk is carried and rotated by the shaft 11 upon which it is mounted. The shaft has a reduction 33 providing a shoulder against which the washer 34 is clamped by the nut 35 of the threaded part of the reduction. The section 18 has a small counterbore 36 to make room for the nut.

A stub shaft 37, made integral with the left section 18 completes the support of the casing 16. This shaft turns in the bushing 38 of the bearing 10. The shaft carries a plate 39 to which may be coupled a machine to be driven.

The operation is readily understood from the following additional description: It will be noted that when the disk 32, appropriately termed the driving element, rotates, the weights 29 will alternately slide toward and away from the axis of rotation, i. e. the shafts 11 and 37 causing the exertion of variable forces upon the elliptical races 23 and 24.

These forces are resultant of centrifugal force and reaction forces causing an acceleration of motion of the weights along the slots 31. The ultimate turning movement or torque at the casing 16 and shaft 37, appropriately termed the driven element, is the combined result of said forces and is proportional to the load within certain limits, to the mass of the weights 29 and to the square of speed of the driving element.

It is to be understood that the introduction of ball bearings, oiling system, and other adjuncts necessary to a mechanism of this kind, will not change the principles above declared. While the construction and arrangement of the compensator is that of a generally preferred form, obviously, modifications and changes may be made without departing from the spirit of the invention or scope of the claims.

I claim:

1. A device of the character described comprising a driving element having radial slots, a driven element rotatable independently of said driving element being arranged to house the driving element, eccentric races including elliptical races in said driven element confronting said driving element, weights slidable in said slots when the driving element is rotated, and rollers carried by said weights actuated in said eccentric races to rotate said driven element.

2. A device of the character described comprising a driving shaft, a radially slotted driving disk carried by said shaft, a driven element composed of counterbored sections housing the driving disk, elliptical races in the counterbored sections, slotted weights slidable in the slots of the disk, trunnions extending from said weights, rollers carried by the trunnions being operable in said races, and means on the trunnions to keep the rollers in place.

MARTIN J. WACLAW.